United States Patent Office 2,834,683
Patented May 13, 1958

2,834,683

METHOD OF PREPARING COLD WATER-SOLUBLE GELATIN AND THE RESULTING PRODUCT

Leo D. Corben, Roxbury, and Ernst Albert Steigmann, Stoneham, Mass., assignors to General Foods Corporation, New York, N. Y., a corporation of Delaware No Drawing. Application June 25, 1956
Serial No. 593,343

13 Claims. (Cl. 99—130)

This invention relates to a method of preparing gelatin which is soluble in cold water and to the product so formed.

Gelatinous substances which swell on contact with water, typified by gelatin, find use in a wide variety of systems wherein the colloidal or gel forming properties of these materials permit attainment of desired characteristics. Although gelatin is commonly available as a finely divided powder, most of the uses to which it may be put involve solution in hot water as a preliminary step. It is found that when powdered gelatin is added to cold water, it will not dissolve. Even under most favorable conditions of particle size or agitation, the gelatin will fail to dissolve in cold water after extended period of time.

Heretofore, efforts have been made by those skilled in the art to modify the properties of swelling compounds such as gelatinous products including gelatin as well as glues, alginates, pectins, etc., to obtain high rate of solubility at low temperature, i. e., to prepare cold water-soluble products. Such attempts have included treatment of e. g. gelatin by physical techniques including various methods of forming the solidified product from solution such as spray drying, freeze drying, drum drying, and puffing. The addition of various additives has also been tried. It has not however been found to be possible to prepare by such prior art processes gelatins which in all respects are completely satisfactory from the point of view of cold water solubility. In particular, solid gelatins prepared according to prior art processes are found not to be soluble in water at temperatures as low as 1° C.–20° C. Furthermore when prior art products are contacted with water, it is found that these products, particularly those formed by spray drying or drum drying, cake or agglomerate with the result that they do not go into solution completely. Gelatin formed by freeze drying is even more deficient in this respect and cakes to such an extent that complete solution is only effected with great difficulty, if at all. These prior art products, particularly when lyophilized e. g. with sugar, are found to be hygroscopic and readily absorb moisture from air to set to a hard mass which makes handling difficult. The density of these products is also undesirably low, especially those prepared by freeze drying and spray drying techniques.

It is an object of this invention to prepare a cold water-soluble gelatin. It is a second object of this invention to prepare such a gelatin characterized by low tendency to cake on contact with water, low hygroscopicity, and high density. Other objects will be apparent to those skilled in the art on inspection of the following description.

Cold water solubility, as the term is herein employed, means solubility in water at temperatures within the range of about 1° C. to 15° C. or 20° C. Testing for cold water solubility is effected by first wetting 10 g. of the gelatin to be tested with 50 cc. of a test solution. The test solution is prepared by adding to 160 cc. of isopropyl alcohol, (a) 1 cc. of a wetting agent such as Tween 60 or Tween 80 which are commercially available wetting agents made by Atlas Powder Co., respectively containing polyoxyethylene sorbitan monostearate and polyoxyethylene sorbitan monooleate, and (b) an antifoam agent such as DC Antifoam A wax which is a commercially available antifoaming agent made by Dow Corning Co. containing a wax which comprises polymeric silicone compounds (i e. alkyl or alkoxy polysiloxanes e. g. methyl or methoxy polysiloxanes).

The test solution is decanted or filtered from the gelatin sample and 20 cc. of cold water is added to the sample at appropriate temperature. The mixture may be agitated as by a spoon or by use of a shaker. The same procedure is repeated on other gelatin samples using water at different temperatures. The lowest temperature at which the gelatin dissolves completely is noted as the temperature at which the gelatin is soluble.

According to certain of the aspects of this invention, cold water-soluble gelatin product may be prepared by contacting gelatin solution at temperature above its aggregation temperature with a liquid dehydrating medium, and maintaining the mixture at temperature of 50° C.–70° C. whereby cold water-soluble gelatin is formed in the reaction mixture and precipitates therefrom.

The gelatin from which the desired cold water-soluble product may be prepared according to this invention may be in solid or liquid (i. e. solution) form. If it is in solid form, it will be dissolved in water to form a solution of desired concentration. Any concentration may be used. Gelatin of any desired bloom may be employed.

It may be desirable to introduce certain ingredients into the reaction system prior to the formation or separation of the solid cold water-soluble gelatin. These ingredients, which may permit attainment of even more highly desirable properties of the product, may be introduced along with the gelatin solution and may include lyophilizing or solubilizing agents (which may also serve as sweetening or flavoring agents). The following may be employed: organic acids including gluconic acid, glucuronic acid, or citric acid; glucurono delta-lactone; sugars including fructose, sucrose, galactose, maltose, glucose, etc.; synthetic polymers such as low viscosity polyvinyl alcohol; hydroxy compounds such as sorbitol; low molecular weight dextrans; etc. Particularly desirable as lyophilizing agents are the so-called "Schardinger dextrins" which include cyclohexa-amylose, hepta-amylose, and octa-amylose.

Presence of non-ionic lyophilizing agents is particularly desirable in that they permit attainment of even greater cold water solubility of the product gelatin. Tests on prior art gelatins containing lyophilizing agents demonstrate a marked superiority of the product of this invention containing lyophilizing agents; specifically prior art gelatins, including those containing lyophilizing agents, have cold water solubility above about 25° C., whereas those of this invention have cold water solubility of less than 20° C. and usually 1° C. to 15° C. Sugars are particularly desirable as lyophilizing agents when they are a component of the ultimate product to be prepared from the gelatin. The lyophilizing agents may be present in this charge solution in varying amounts. When a sugar such as sucrose is present, it may be present in amount as high as 1000% of the gelatin. The cold water solubility of high (i. e. 100–250) bloom cold water-soluble gelatins prepared according to this invention may be considerably enhanced by the presence of lyophilizing agents such as sugar. Specifically, it is possible to render high bloom gelatins of this invention soluble down to temperatures approaching 1° C. by use of sugar in amounts as high as 1000% by weight of the gelatin.

It may also be desirable to introduce into the system prior to formation of the solid cold water-soluble gelatin, 1%–2% or less of certain surface active agents including defoaming agents, wetting agents, dispersants, or detergents. Non-ionic dispersing agents such as "Tween" may be employed. Also suitable are the sulfated monoglycerides of fatty acids, e. g. sodium salts of sulfated glyceryl monostearate, or oleate, or laurate. Particularly effective results in terms of ease of solution of the cold water-soluble product of this invention are obtained when lyophilizing agents are present together with defoaming agents.

Other agents may also be present, including coloring agents, flavoring agents, perfuming agents, salts, etc. depending on the particular ultimate use to be made of the product gelatin.

The dehydrating medium employed in connection with the instant process is a liquid which has a high affinity for water under the conditions of operation. It preferably has the following characteristics: (a) high miscibility with water over a wide range of concentrations; (b) low solubility of gelatin therein; (c) low tendency to be occluded in or on the product gelatin; and (d) boiling point within the range above about 40° C. and below about 100° C. whereby the medium will be in liquid phase under the conditions of operation and be conveniently removable at low to moderate temperature as hereinafter described.

Typical dehydrating media which may be used include alcohols such as methanol, ethanol, propanol, isopropanol, or tertiary butyl alcohol; ketones such as acetone; or mixtures of any of these. Preferred dehydrating media may be ethanol, isopropanol, or a mixture of 50% acetone and 50% isopropanol. Acetone-methyl ethyl ketone is another example of a water-miscible mixture which may be employed. Preferably the medium will be anhydrous, but it may contain up to about 5% water.

In operation of the process according to certain of its aspects the gelatin solution, optionally containing the lyophilizing agents, dispersing agents, defoaming agents, coloring agents, flavoring agents, and perfuming agents, is maintained at temperature which is above the aggregation temperature of the gelatin of about 40° C., e. g. at 50° C. to 70° C. At these temperatures, the solution is a true solution of gelatin. By the term "aggregation temperature" is meant the temperature at which a gelatin solution begins to gel as the solution is cooled.

The dehydrating medium, as employed in the preferred practice of this invention, will be maintained in liquid phase at temperature which may approach or attain its boiling point under the conditions of operation; preferably however, it will be below the boiling point. It will typically fall within the range of 40° C. to 100° C. When the media employed are as indicated below, the temperature range thereof may be as noted:

| Dehydrating medium: | Temperature, ° C. |
|---|---|
| Isopropanol | 40 to 82 |
| Methanol | 40 to 64 |
| Ethanol | 40 to 78 |
| Propanol | 40 to 97 |
| t-Butylalcohol | 40 to 82 |
| Acetone | 40 to 56 |

Conversion of the gelatin to the desired cold water-soluble product is effected by admixing the charge solution at e. g. 50° C.–70° C. with the dehydrating medium. Preferably the dehydrating medium will be at higher temperature than the gelatin solution when the two are mixed. Although mixing may be done according to various contacting techniques and in various types of equipment, it is preferred that the dehydrating medium be maintained as a continuous body and that the gelatin solution be added thereto under conditions such that the former is the continuous phase within which the latter is distributed. The gelatin solution may be admitted in the form of drops, or spray, or as one or more thin streams. Under desired conditions, the reaction mixture may be subjected to agitation to effect as complete intermixing as possible.

The reaction mixture will be maintained in the preferred temperature range of 50° C.–70° C., and under these conditions the desired cold water-soluble gelatin is formed in and precipitates from solution in amorphous form over a period of about e. g. 10–30 minutes. Further treatment includes separating the precipitate from supernatant liquid as by decantation or filtration of the latter, and treating the precipitate with additional dehydrating medium in subsequent steps.

Although the subsequent treating steps may be conducted using different dehydrating media, amount of dehydrating medium, times of contact, or other conditions of operation, preferably the same medium and the same conditions will be used as those which prevail in the first step.

On completion of the first precipitation step and the ensuing treating steps which complete the dehydration, the amorphous gelatin precipitate may be dried by contact with hot gas e. g. air to remove last traces of dehydrating medium therefrom. Typically the gelatin may be placed in an oven and contacted with hot air at temperature of 100° C. although it may be as low as 50° C. It will preferably be above the boiling point of the dehydrating medium. Yields approaching substantially 100% based on the gelatin in the original solution may be obtained.

The amorphous, cold water-soluble gelatin produced according to this process possesses the following characteristics: solubility in water (as determined by the test hereinbefore described in detail) at temperature less than 20° C. which may be as low as about 10° C., and typically 1° C. to 15° C.; substantial freedom from caking; low hygroscopicity; and high density. The density for example may be 2–3 times greater than that of spray dried gelatin and as much as 10 times greater than that of freeze dried gelatin. Although this product will usually dissolve with little or no stirring, agitation is preferably provided to effect dissolution, and under these conditions, the gelatin may dissolve in about two minutes or less. Preferred particle size is 100 mesh or smaller. When the surface active agents or the lyophilizing agents are added to the system prior to precipitation of the gelatin, these agents will be found in the cold water-soluble product and permit even faster rate of solution at a given temperature.

The following specific examples illustrate specific embodiments of the invention:

*Example 1*

According to one example of this invention, a solution was prepared from a gelatin having a bloom of 36, a viscosity of 16 millipoises, and a pH of 6.15. 30 g. of this gelatin and 7.2 g. of citric acid were added to 120 cc. of water at room temperature. The mixture was permitted to soak for 10–15 minutes after which it was heated to 60° C. at which point solution was complete. 30 g. of granulated sugar were added and this dissolved substantially immediately.

This solution at 60° C. was poured in a thin stream into a first aliquot of about 600 cc. of isopropyl alcohol, the latter being at temperature of 60–70° C. The mixture was maintained at about 60–70° C. for ten minutes, after which time the supernatant liquid was poured off from the precipitate. The precipitated gelatin was then contacted with a second aliquot of 500–600 cc. of isopropyl alcohol at 70° C. A third, fourth, and fifth aliquot of the same amount of 70° C. isopropyl alcohol were added at five minute intervals, in each case the alcohol present being previously poured off as before. After the last aliquot of alcohol had been drained, the solid precipitate was air dried with frequent stirring for 15–20 minutes in a 100° C. oven. Dried product was ground to 100–200 mesh.

When tested according to the testing procedure hereinbefore set forth, it was found that the product of this example was soluble in water at 15° C. with spoon stirring. It did not cake when added to water. On standing, it was not hygroscopic. Its density was found to be higher than gelatin products prepared as by freeze drying or spray drying.

*Example II*

According to another example of this invention, a solution is prepared by adding 30 g. of a 50 bloom gelatin to 100 cc. of water at room temperature (i. e. 20° C.). After standing for 10–15 minutes, the mixture is heated to 60° C. and stirred to effect solution of the gelatin.

The solution at 60° C. is poured into 600 cc. of acetone, the latter also being at 60° C. A precipitate forms over a period of about 30 minutes, and at the end of this time, the supernatant liquid is poured off. A second aliquot of 600 cc. of acetone at 60° C. is added and poured off after 30 minutes, and in similar manner, third, fourth, and fifth aliquots are added, permitted to contact the precipitate each for about 30 minutes and then decanted. The precipitate remaining after the last aliquot is poured off, is air dried with frequent stirring in a 100° C. oven and then ground to about 100–200 mesh.

Testing of the gelatin product so prepared indicates that it has cold water solubility of 5° C. with spoon stirring. This product does not cake on addition of water. It is non-hygroscopic on standing even in the presence of added ingredients. It has density approximately ten times that of freeze dried gelatin and approximately 3 times that of spray-dried gelatin.

*Example III*

According to still another example of this invention a solution is prepared by adding 20 g. of 250 bloom gelatin to 100 cc. of water at room temperature. After standing for 10–15 minutes the mixture was heated to 60° C. and stirred to effect solution of the gelatin. 200 g. of granulated sugar (i. e. sucrose) were added and this dissolved substantially immediately.

The gelatin-sugar solution at 60° C. is poured into 600 cc. of dehydrating medium (also at 60° C.), which in this example was a mixture of equal parts by weight of acetone and isopropanol. A precipitate forms over a period of about 30 minutes, and at the end of this time, the supernatant liquid is poured off. A second aliquot of 600 cc. of dehydrating medium at 60° C. is added and poured off after 30 minutes, and in similar manner, third, fourth and fifth aliquots are added, permitted to contact the precipitate each for about 30 minutes and then decanted. The precipitate remaining after the last aliquot is poured off, is air dried with frequent stirring in a 100° C. oven and then ground to about 100–200 mesh.

Testing of the lyophilized gelatin product of this example indicates that it has a cold water solubility of 10° C. Otherwise this product has substantially the same physical properties as the product prepared according to Example II.

Although we have herein described specific examples showing certain details of our invention, it will be apparent to those skilled in the art that various modifications and changes may be made which come within the scope of this invention.

What is claimed is:

1. The method of preparing cold water-soluble gelatin characterized by solubility in water at temperature as low as 1° C.–20° C., low tendency to cake on contact with water, low hygroscopicity, and high density which comprises contacting a solution of gelatin at temperature above its aggregation temperature with a liquid dehydrating medium, maintaining the mixture at temperature of 50° C.–70° C. whereby cold water-soluble gelatin is formed in and precipitates from the reaction mixture, and separating cold water-soluble gelatin from said reaction mixture.

2. The method of preparing cold water-soluble gelatin characterized by solubility in water at temperature as low as 1° C.–20° C., low tendency to cake on contact with water, low hygroscopicity, and high density as claimed in claim 1 wherein said dehydrating medium is selected from the group consisting of alcohols and ketones having a boiling point of 40° C.–100° C.

3. The method of preparing cold water-soluble gelatin characterized by solubility in water at temperature as low as 1° C.–20° C., low tendency to cake on contact with water, low hygroscopicity, and high density which comprises contacting a solution of gelatin at temperature above its aggregation temperature with liquid dehydrating medium at temperature higher than that of said solution, maintaining the mixture at temperature of 50° C.–70° C. whereby cold water-soluble gelatin is formed in and precipitates from the reaction mixture, and separating said cold water-soluble gelatin from said reaction mixture.

4. The method of preparing cold water-soluble gelatin characterized by solubility in water at temperature as low as 1° C.–20° C., low tendency to cake on contact with water, low hygroscopicity, and high density which comprises contacting a solution of gelatin at temperature above its aggregation temperature with liquid dehydrating medium, maintaining the mixture at temperature of 50° C.–70° C. whereby solid cold water-soluble gelatin is formed in and precipitates from the reaction mixture, separating said cold water-soluble gelatin from said reaction mixture substantially immediately, and treating the said cold water-soluble gelatin with additional liquid dehydrating medium.

5. The method of preparing cold-water-soluble gelatin characterized by solubility in water at temperature as low as 1° C.–20° C., low tendency to cake on contact with water, low hygroscopicity, and high density which comprises contacting a solution of gelatin at temperature above its aggregation temperature with liquid dehydrating medium, maintaining the mixture at temperature of 50° C.–70° C. whereby solid cold water-soluble gelatin is formed in and precipitates from the reaction mixture substantially immediately, separating said cold water-soluble gelatin from said reaction mixture, treating the said cold water-soluble gelatin with additional liquid dehydrating medium, and drying said solid cold water-soluble gelatin in contact with hot gas.

6. The method of preparing cold water-soluble gelatin characterized by solubility in water at temperature as low as 1° C.–20° C., low tendency to cake on contact with water, low hygroscopicity, and high density which comprises contacting a solution of gelatin at temperature above its aggregation temperature with isopropyl alcohol, maintaining the mixture at temperature of 50° C.–70° C. whereby cold water-soluble gelatin is formed in and precipitates from the reaction mixture substantially immediately, and separating said cold water-soluble gelatin from said reaction mixture.

7. The method of preparing cold water-soluble gelatin characterized by solubility in water at temperature as low as 1° C.–20° C., low tendency to cake on contact with water, low hygroscopicity, and high density which comprises maintaining a body of liquid dehydrating medium as continuous phase, adding thereto at temperature above its aggregation temperature a solution of gelatin to form a mixture wherein the gelatin solution is the discontinuous phase within a continuous phase of liquid dehydrating medium, maintaining the mixture at temperature of 50° C.–70° C. whereby cold water-soluble gelatin is formed in and precipitates from said reaction mixture substantially immediately.

8. The method of preparing cold water-soluble gelatin characterized by solubility in water at temperature as low as 1° C.–20° C., low tendency to cake on contact with water, low hygroscopicity, and high density which comprises contacting a solution of gelatin at temperature above its aggregation temperature with liquid dehydrating medium at temperature of 40° C.–100° C., maintaining said mixture at temperature of 50° C.–70° C., whereby cold water-soluble gelatin is formed in and precipitates from the reaction mixture substantially immediately, adding lyophilizing agent to the reaction mixture before precipitation of said cold water-soluble gelatin, and separating said cold water-soluble gelatin containing lyophilizing agent from said reaction mixture.

9. The method of preparing cold water-soluble high bloom gelatin characterized by solubility in water at temperature as low as 1° C.–20° C., low tendency to cake on contact with water, low hygroscopicity, and high density which comprises contacting a solution of high bloom gelatin at temperature above its aggregation temperature with liquid dehydrating medium at temperature of 40° C.–100° C., maintaining the mixture at temperature of 50° C.–70° C. whereby cold water-soluble high bloom gelatin is formed in and precipitates from the reaction mixture substantially immediately, adding lyophilizing agent to the reaction mixture before precipitation of said cold water-soluble high bloom gelatin, and separating said cold water-soluble high bloom gelatin containing lyophilizing agent from said reaction mixture.

10. The method of preparing cold water-soluble gelatin characterized by solubility in water at temperature as low as 1° C.–20° C., low tendency to cake on contact with water, low hygroscopicity, and high density as claimed in claim 9, wherein the lyophilizing agent is a sugar, present in amount sufficient to yield in the precipitated gelatin a concentration of sugar up to 1000% by weight of the gelatin.

11. The method of preparing cold water-soluble gelatin characterized by solubility in water at temperature as low as 1° C.–20° C., low tendency to cake on contact with water, low hygroscopicity, and high density which comprises contacting a solution of gelatin at temperature above its aggregation temperatures with liquid dehydrating medium, maintaining the mixture at temperature of 50° C.–70° C. whereby cold water-soluble gelatin is formed in and precipitates from the reaction mixture substantially immediately, adding a surface active agent to the reaction mixture before precipitation of said cold water-soluble gelatin, and separating said cold water-soluble gelatin containing surface active agent from said reaction mixture.

12. The method of preparing cold water-soluble gelatin characterized by solubility in water at temperature as low as 1° C.–20° C., low tendency to cake on contact with water, low hygroscopicity, and high density, which comprises contacting a solution of gelatin at temperature above its aggregation temperature with liquid dehydrating medium, maintaining the mixture at temperature of 50° C.–70° C. whereby cold water-soluble gelatin is formed in and precipitates from the reaction mixture substantially immediately, separating said cold water-soluble gelatin from said reaction mixture, and adding a lyophilizing agent and a surface active agent to said reaction mixture before separation of cold water-soluble gelatin whereby the latter contains lyophilizing agent and surface active agent.

13. A cold water-soluble gelatin characterized by solubility in water at temperature as low as 1° C.–20° C., low tendency to cake on contact with water, low hygroscopicity, and high density, prepared by the process comprising contacting a solution of gelatin at temperature above its aggregation temperature with a liquid dehydrating medium, maintaining the mixture at temperature of 50° C.–70° C. whereby cold water-soluble gelatin is formed in and precipitates from the reaction mixture substantially immediately, and separating said cold water-soluble gelatin from said reaction mixture.

References Cited in the file of this patent

UNITED STATES PATENTS

| | | |
|---|---|---|
| 2,109,950 | Rooker | Mar. 1, 1938 |
| 2,292,022 | Christopher | Aug. 4, 1942 |
| 2,400,375 | Sheppard et al. | May 14, 1946 |
| 2,423,773 | Hart et al. | July 8, 1947 |